J. E. DUBUISSON.
COFFEEPOT.
APPLICATION FILED APR. 4, 1921.
1,413,012.                                Patented Apr. 18, 1922.
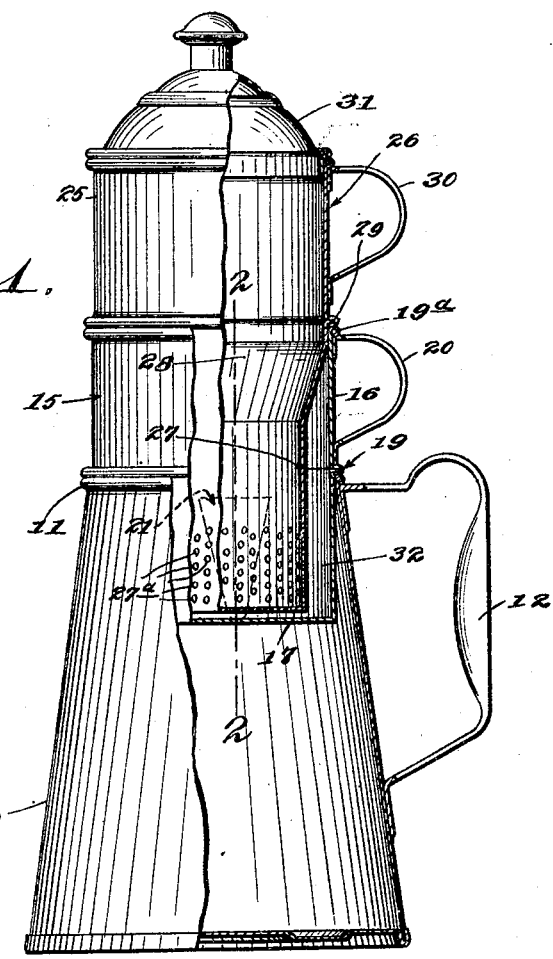
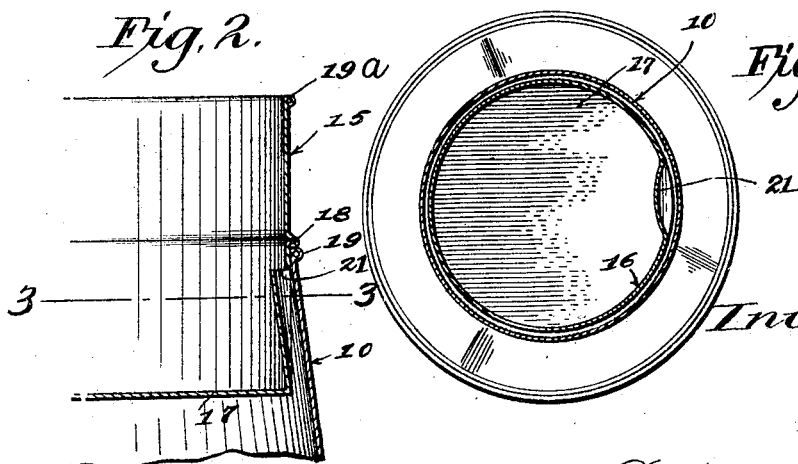
Inventor:
Jules E. Dubuisson

UNITED STATES PATENT OFFICE.

JULES E. DUBUISSON, OF PENSACOLA, FLORIDA.

COFFEEPOT.

1,413,012.  Specification of Letters Patent.  Patented Apr. 18, 1922.

Application filed April 4, 1921. Serial No. 458,562.

*To all whom it may concern:*

Be it known that I, JULES E. DUBUISSON, a citizen of the United States, and a resident of Pensacola, in the county of Escambia and State of Florida, have invented certain new and useful Improvements in Coffeepots, of which the following is a specification.

The present invention relates to an improvement in coffee pots or coffee making devices, and has for its object to provide a device of this character which is of extremely simple and durable construction, ornamental in appearance, and easy and inexpensive to manufacture and which operates in a novel and highly effective manner to produce a beverage of rich strength, flavor and aroma, and in such a manner as to completely extract all of the desirable substance in the coffee without extracting or converting other substances liable to impair the quality of the beverage.

Other objects and advantages of the invention reside in certain novel features of construction, combination and arrangement of parts which will be hereinafter more fully described and particularly pointed out in the appended claims, reference being had to the accompanying drawings forming part of this specification, and in which:

Figure 1 is a view, partly in elevation and partly in vertical section, illustrating the preferred embodiment of the invention;

Figure 2 is a view in vertical section, on line 2—2 of Figure 1; and

Figure 3 is a view in horizontal section, on line 3—3 of Figure 2.

Referring to the drawings wherein for the sake of illustration is shown the preferred embodiment of the invention, the numeral 10 designates generally a main coffee pot or outer vessel which has its upper open end provided with a reinforced rim 11 and which is equipped with a handle 12. A receptacle, designated generally at 15, is associated with the outer vessel 10 and preferably comprises a cylindrical body portion 16 fitted into the upper open end of the outer vessel 10 and extending down into the outer vessel for a substantial distance. At its lower end the cylindrical body portion 16 is provided with an imperforate bottom 17 and intermediate its ends it is provided with a crimp or bead 18 presenting a shoulder or ledge which rests upon the rim 11 of the outer vessel to support the receptacle 15 in position. The upper end of the receptacle 15 is also provided with a rim designated at 19ª, and at one side a handle 20 is fixed thereto. Slightly below the crimp 18 the cylindrical body portion 16 is slit or severed circumferentially for a short distance and bent inwardly to provide an outlet from the receptacle 15 into the outer vessel 10. This outlet is related to the other elements of the invention in a manner which will hereinafter more fully appear.

A container, designated generally at 25, is associated with the receptacle 15 and includes an upper relatively large cylindrical section 26, a lower relatively small cylindrical section 27 and an intermediate section 28 of frusto-conical form which is integral with the upper and lower sections and serves to connect them. Between the frusto conical section 28 and the upper cylindrical section 26 a crimp or bead 29 is formed and constitutes a ledge or shoulder which rests upon the rim 19ª of the receptacle 15 and supports the container 25 in the assembly. A handle 30 is fixed to the upper cylindrical section 26 of the container 25 and the upper open end of the container is fitted with a cover 31.

When the container 25 is assembled with the receptacle 15 its lower cylindrical section 27 as well as its frusto conical section 28 is received within the receptacle 15 and as the lower cylindrical section 27 is of a somewhat lesser cross sectional area than the receptacle 15 this section 27 and the receptacle define an annular space 32 between them. The lower portion of the section 27 of the container in the region of the annular space 32 is perforated, as at 27ª, and this perforated space constitutes a container for the coffee from which the beverage is to be made. As shown in Figure 1, the outlet 21 is arranged in the annular space 32 but above the perforated portion of the section 27 for a purpose which will presently be described.

In the use of the device, coffee is placed within the perforated portion of the container 25, and this container is placed in the receptacle 15 which in turn is positioned in the outer vessel 10 all as shown in Figure 1. Boiling water is then poured into the container 25 on the coffee therein. The boiling water percolates through the coffee and out through the perforations 27ª into the annular space 32 wherein it is still in communication with the coffee within the perforated portion of the section 27 of the container. As the boiling water continues to percolate through the coffee the level of the liquid in the annular space 32 gradually rises and finally it reaches the level of the outlet 21 which as has been described is above the level of the coffee. By this time the boiling water has completely extracted all of the desirable substances from the coffee to produce a beverage of rich strength, flavor and aroma, and the completed beverage then flows out through the outlet 21 into the outer vessel 10 from which it may be dispensed as desired. This operation has been found to invariably produce a delicious beverage but if desired the liquid which flows through the outlet 21 into the outer vessel 10 may again be poured into the container 25 to repeat the percolation.

I claim:

1. In a device of the character described, an outer vessel having an upper open end provided with a rim, a receptacle associated with said outer vessel and including a cylindrical body portion fitted in the upper open end of the outer vessel and having a ledge intermediate its ends engaging the rim to support the receptacle in position, an imperforate bottom at the lower end of said cylindrical body portion and a rim at the upper end of said cylindrical body portion, said cylindrical body portion being provided immediately below said ledge with an outlet opening into the outer vessel, and a container associated with the receptacle and comprising an upper enlarged cylindrical section, a lower relatively small cylindrical section and an intermediate section of frusto-conical form integral with said upper and lower sections, said frusto-conical section and said lower section being received in said container, said receptacle being provided with a ledge between said upper section and said frusto conical section engaging the rim of the receptacle to support the container in position, said lower section and said container defining an annular space, and said lower section having a perforated portion in the region of said annular space and below the level of the outlet of said receptacle.

2. In a device of the character described, an outer vessel having an upper open end, a receptacle associated with said outer vessel and including a cylindrical body portion fitted in the upper open end of the outer vessel, an imperforate bottom at the lower end of said cylindrical body portion, said cylindrical body portion being provided with an outlet opening into the outer vessel, and a container associated with the receptacle and comprising an upper enlarged cylindrical section, a lower relatively small cylindrical section, and an intermediate section of frusto-conical form integral with said upper and lower sections, said frusto conical section and said lower section being received in said container, said lower section and said container defining an annular space, and said lower section having a perforated portion in the region of said annular space and below the level of the outlet of said receptacle.

3. In a device of the character described, an outer vessel, a receptacle fitted in said outer vessel and having an outlet opening therein and a container fitted in said receptacle and having a perforated portion disposed in the lower portion of said receptacle and spaced therefrom to provide a liquid space, the perforated portion of the container being disposed below the level of the outlet opening of the receptacle.

JULES E. DUBUISSON.